(12) United States Patent
Kojori

(10) Patent No.: US 7,884,495 B2
(45) Date of Patent: Feb. 8, 2011

(54) METHOD AND APPARATUS FOR HOT SWAP OF LINE REPLACEABLE MODULES FOR AC AND DC ELECTRIC POWER SYSTEMS

(75) Inventor: Hassan Ali Kojori, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 1303 days.

(21) Appl. No.: 11/434,246

(22) Filed: May 16, 2006

(65) Prior Publication Data

US 2007/0271403 A1 Nov. 22, 2007

(51) Int. Cl.
  H02J 1/00 (2006.01)
  H02J 3/00 (2006.01)
(52) U.S. Cl. .................. 307/31; 439/181; 439/924.1
(58) Field of Classification Search .............. 307/31; 439/181, 924.1
  See application file for complete search history.

(56) References Cited

U.S. PATENT DOCUMENTS

| | | | |
|---|---|---|---|
| 5,028,809 A | 7/1991 | Watanabe et al. | |
| 5,729,062 A | 3/1998 | Satoh | |
| 5,881,251 A | 3/1999 | Fung et al. | |
| 5,996,035 A | 11/1999 | Allen et al. | |
| 6,006,298 A | 12/1999 | Satoh | |
| 6,026,458 A | 2/2000 | Rasums | |
| 6,088,209 A | 7/2000 | Sink | |
| 6,121,693 A | 9/2000 | Rock | |
| 6,162,073 A | 12/2000 | Haq et al. | |
| 6,222,708 B1 * | 4/2001 | Severson et al. ............. 361/2 |
| 6,232,676 B1 | 5/2001 | Kozyra et al. | |
| 6,310,410 B1 | 10/2001 | Lin | |
| 6,353,523 B1 | 3/2002 | Niv et al. | |
| 6,400,203 B1 | 6/2002 | Bezzi et al. | |
| 6,447,309 B1 | 9/2002 | Ko et al. | |

(Continued)

FOREIGN PATENT DOCUMENTS

DE 89-03-649 U1 5/1990

(Continued)

OTHER PUBLICATIONS

"Hot-Swap Hardware And Software Hurldes Continue To Fall," Power Design; Peter Varhol; May 1, 2000.

(Continued)

Primary Examiner—Hal I Kaplan
(74) Attorney, Agent, or Firm—Oral Caglar, Esq.

(57) ABSTRACT

A method and an apparatus are used in hot swap of AC or DC line replaceable modules (40A). The apparatus according to one embodiment comprises a pin assembly (183), the pin assembly (183) being connectable to a module (40A) and connectable to a backplane (104), the pin assembly (183) resistively reducing a current associated with the module (40A) during disconnection of the module (40A) from the backplane (104), and presenting a high resistance to the module (40A) during connection of the module (40A) to the backplane (104), and a low resistance to the module (40A) at completion of the connection of the module (40A) to the backplane (104); and a hot swap detector (134) connectable to the pin assembly (183), the hot swap detector (134) detecting the disconnection of the module (40A) from the backplane (104), and detecting the connection of the module (40A) to the backplane (104).

19 Claims, 13 Drawing Sheets

U.S. PATENT DOCUMENTS

| | | | |
|---|---|---|---|
| 6,459,600 B2 | 10/2002 | Farrington et al. | |
| 6,522,515 B1 | 2/2003 | Whitney | |
| 6,526,466 B1 | 2/2003 | Frake et al. | |
| 6,528,904 B1 * | 3/2003 | Wong | 307/140 |
| 6,574,695 B1 | 6/2003 | Mott et al. | |
| 6,604,916 B2 | 8/2003 | Lu et al. | |
| 6,636,919 B1 | 10/2003 | Huth | |
| 6,654,843 B1 | 11/2003 | Wakeley et al. | |
| 6,704,825 B1 | 3/2004 | Lascu et al. | |
| 6,771,478 B2 | 8/2004 | Ochi | |
| 6,810,458 B1 | 10/2004 | Bazargan et al. | |
| 6,850,048 B2 | 2/2005 | Orr et al. | |
| 6,856,045 B1 | 2/2005 | Beneditz et al. | |
| 6,857,887 B1 * | 2/2005 | Belson et al. | 439/181 |
| 7,028,125 B2 * | 4/2006 | Lee | 710/300 |
| 2004/0014344 A1 | 1/2004 | Yamamoto | |
| 2004/0057182 A1 | 3/2004 | Yuan | |
| 2004/0225801 A1 | 11/2004 | Scordalakes et al. | |

FOREIGN PATENT DOCUMENTS

| | | |
|---|---|---|
| DE | 102-53-749 A1 | 6/2004 |
| JP | 03-020978 A | 1/1991 |
| JP | 5-327244 A | 12/1993 |
| JP | 2002-32151 A | 1/2002 |
| JP | 2002-55745 A | 2/2002 |
| JP | 2003-208358 A | 7/2003 |
| WO | WO-97/41516 A1 | 11/1997 |

OTHER PUBLICATIONS

"Introduction to Hot Swap," Texas Instruments; Jonathan M. Bearfield; TechOnLine Publication Date: Sep. 24, 2001.

"Hot-Plug Protection Circuit" Feb. 1, 1990 IBM Technical Disclosure Bulletin, IBM Corp. New York, US, pp. 424-429, XP000082404 ISSN: 0018-8689.

"Direct Access Storage Device (DASD) Concurrent Maintenance" IBM Technical Disclosure Bulletin, IBM Corp. New York, US, vol. 33, No. 8, Jan. 1, 1991, pp. 223-227, XP000106938 ISSN: 0018-8689.

European Search Report dated Aug. 14, 2008.

* cited by examiner

METHOD AND APPARATUS FOR HOT SWAP OF LINE REPLACEABLE MODULES FOR AC AND DC ELECTRIC POWER SYSTEMS

CROSS REFERENCE TO RELATED APPLICATION

This non-provisional application is related to co-pending non-provisional application titled "Method and Apparatus for Integrated Active-Diode-ORing and Soft Power Switching" filed concurrently herewith, the entire contents of which are hereby incorporated by reference.

BACKGROUND OF THE INVENTION

1. Field of the Invention

The present invention relates to electric power systems, and more particularly to a method and apparatus for hot swap of modules for electric power systems.

2. Description of the Related Art

Electric systems used in complex environments such as aerospace systems, more electric aircraft systems, industrial environments, vehicles, etc., include a large number of electric modules. Various electric modules may need to be extracted and replaced with other electric modules, to change functionality or to replace electric modules that exhibit faults.

Hot swap, hot-plug, and hot-dock are terms used interchangeably to refer to the process of safely inserting or removing cards, PC boards, cables, and/or modules from a host system without removing power. The goal of hot swap is to insert or remove modules without disturbing, damaging, or degrading up/down-stream adjacent line replaceable modules/subsystems, to increase system availability, reduce down time, simplify system repair, and allow for system maintenance/upgrade without interrupting service to other loads.

If not designed for properly, hot swap can cause severe electrical, mechanical, thermal and operational problems in an electrical system. For example, random pin arcing may occur during the mating process of a replaceable module with its parent electrical system. Pulling a board/module out while there is current passing through the module connectors, or inserting a board/module with all bulk/bypass capacitors at zero volts, can introduce severe electrical voltage/current transients which may adversely impact reliability and lead to safety consequences. For example, current chopping introduces Ldi/dt variations (where L is inductance of a load, for example) leading to very large voltage transients which are a major safety concern for maintenance people, as large voltage transients can cause high voltage electrical shock.

Typical/conventional hot swap methods do not cover hot swap technologies for higher AC and DC power systems for safe and reliable insertion and removal of different types of line replaceable modules (LRMs) such as: Power Supplies (PS-LRM), Digital Controllers (DC-LRM), AC Solid-State-Remote-Controllers (AC-SSPC-LRM), DC Solid-State-Remote-Power-Controllers (DC-SSPC-LRM), boards including AC and DC Solid State Switching Devices (SSSDs). Such AC and DC power systems may have AC voltages of 115 or 230V, or higher, with fixed frequencies (for example, 50/60 Hz or 400 Hz), or variable frequencies (for example 360-800 Hz for aerospace applications), or DC voltages levels such as, for example, 28V or 270V. The power of such AC or DC systems may depend on the number of channels and current rating and voltage of each channel. For example, an AC LRM for the Airbus A380 aircraft has 8 channels. Such AC and DC LRM boards are currently being deployed in aerospace and industry, and are poised to eventually replace traditional electromechanical AC/DC circuit breakers or relays, to reduce the overall system cost and weight, and improve reliability. Emerging Solid State AC and DC switches are poised to have widespread use in both commercial and military aerospace applications and general industry, for a few Watts to hundreds of KW power applications. Currently, due to excessive cost, weight and board space penalties, AC and DC SSPC LRM cards do not include additional circuit breakers or relays which could be turned-off before initiating a hot swap of a failed LRM with one or more SSPC devices failed short. Hence, conventional hot swap is not properly designed for such LRM/boards. Conventional methods focus on hot swap of boards with fairly low power supply voltages. Even though hot swap technologies have become an integral part of major operating systems in telecommunications, networking and other computer industries, such hot swap systems have not been utilized for high-voltage AC and DC electrical power systems in the aerospace industry or in industrial environments.

A number of publications have studied hot swap techniques for electrical modules. One such technique is described in "*Introduction to Hot Swap*", by Jonathan M. Bearfield, Texas Instruments, TechOnLine, publication date Sep. 24, 2001. In the technique described in this publication, a hot swap system for hot swap of modules includes a connector with long and short pins, a fuse, and an RC circuit. During hot swap of a module, the long pins mate first, adding the RC circuit to pre-charge the module/board. When the board/module is fully inserted, the short pins mate, bypassing the resistor connected to the longer pins and creating a low impedance connection. This technique, however, does not detect board/module insertion or extraction at the beginning of the hot swap process in order to prevent disturbances to various data lines. This technique also does not communicate with the remaining software of the larger electrical system to prevent further abnormal operation or possible damage on circuits surrounding the modules/boards that are hot-swapped.

Another technique is described in patent U.S. Pat. No. 6,006,298 titled "On-Line Module Replacement System", by Tatsuo Satoh. In the technique described in this publication, two power supplies are connected to two pins and to a plug-in module. One pin (first power supply pin) has an insulated portion that is connected to the plug-in module after the other pin (second power supply pin) has been electrically connected to the plug-in module, so that the first pin is electrically disconnected from the module after the second pin has been electrically connected to the module. In this technique, however, two power supplies and a complex long/short pin system with partially insulated sleeves are needed, and the method is not cost effective. Moreover, this method may cause short on the power supplies, particularly if the voltage levels of the power supplies are different. This method may introduce significant electrical (current/voltage) transients during hot swap due to potential current chopping when pulling a module out of a backplane.

A disclosed embodiment of the application addresses these and other issues by utilizing a method and apparatus for hot swap of modules for AC and DC electric power systems that use either low or high supply voltages. The method and apparatus prevent random pin arcing during mating process by reducing the AC or DC current during the MAKE or BREAK process; eliminate in-rush currents during initial insertion of a board/module with all bulk/bypass capacitors at zero volts; prevent current chopping when a board is pulled-out when there is a load current in a normal or fault situation; eliminate large electrical voltage/current transients, such as large voltage transients due to Ldi/dt current chopping variations, which may adversely impact reliability and lead to safety consequences; detects the process of a board/LRM insertion or extraction. The method and apparatus for hot swap of modules for AC and DC electric power systems can be used for both low and high power systems.

SUMMARY OF THE INVENTION

The present invention is directed to a method and an apparatus for hot swap of AC or DC line replaceable modules. According to a first aspect of the present invention, an apparatus for hot swap of AC or DC line replaceable modules comprises: a pin assembly, the pin assembly being connectable to a module and connectable to a backplane, the pin assembly resistively reducing a current associated with the module during disconnection of the module from the backplane, and presenting a high resistance to the module during connection of the module to the backplane, and a low resistance to the module at completion of the connection of the module to the backplane; and a hot swap detector connectable to the pin assembly, the hot swap detector detecting the disconnection of the module from the backplane, and detecting the connection of the module to the backplane.

According to a second aspect of the present invention, an apparatus for hot swap of AC or DC line replaceable modules comprises: a first hot swap protection circuit connected to a first electrical line and a second electrical line, wherein the first electrical line and the second electrical line are connectable to a line replaceable module, the first hot swap protection circuit including two first line diodes connected to the first line, one of the two first line diodes being forward biased from the first line and the other of the two first line diodes being reverse biased from the first line, and two second line diodes connected to the second line, one of the two second line diodes being forward biased from the second line, the other of the two second line diodes being reverse biased from the second line, the second line diode forward biased from the second line being connected at a first point to the first line diode forward biased from the first line, and the second line diode reverse biased from the second line being connected at a second point to the first line diode reverse biased from the first line.

According to a third aspect of the present invention, an apparatus for hot swap of AC or DC line replaceable modules comprises: a hot swap protection circuit connected to a first electrical line and a second electrical line, wherein the first electrical line and the second electrical line are included in a line replaceable module, the first hot swap protection circuit including two first line diodes connected to the first line, one of the two first line diodes being forward biased from the first line and the other of the two first line diodes being reverse biased from the first line, two second line diodes connected to the second line, one of the two second line diodes being forward biased from the second line, the other of the two second line diodes being reverse biased from the second line, the second line diode forward biased from the second line being connected at a first point to the first line diode forward biased from the first line, and the second line diode reverse biased from the second line being connected at a second point to the first line diode reverse biased from the first line, and a capacitor and a resistor, wherein the resistor is connected in series with the capacitor, and the capacitor and the resistor are connected between the first point and the second point.

According to a fourth aspect of the present invention, a method for hot swap of AC or DC line replaceable modules, comprises: capturing front end stored energy in front end inductances of a front end of an electrical system during extraction of a line replaceable module, the step of capturing front end stored energy using a first electrical line and a second electrical line of the front end, two first line front end devices connected to the first line, one of the two first line front end devices being forward biased from the first line and the other of the two first line front end devices being reverse biased from the first line, and two second line front end devices connected to the second line, one of the two second line front end devices being forward biased from the second line, the other of the two second line front end devices being reverse biased from the second line, the second line front end device forward biased from the second line being connected at a first point to the first line front end device forward biased from the first line, and the second line front end device reverse biased from the second line being connected at a second point to the first line front end device reverse biased from the first line.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
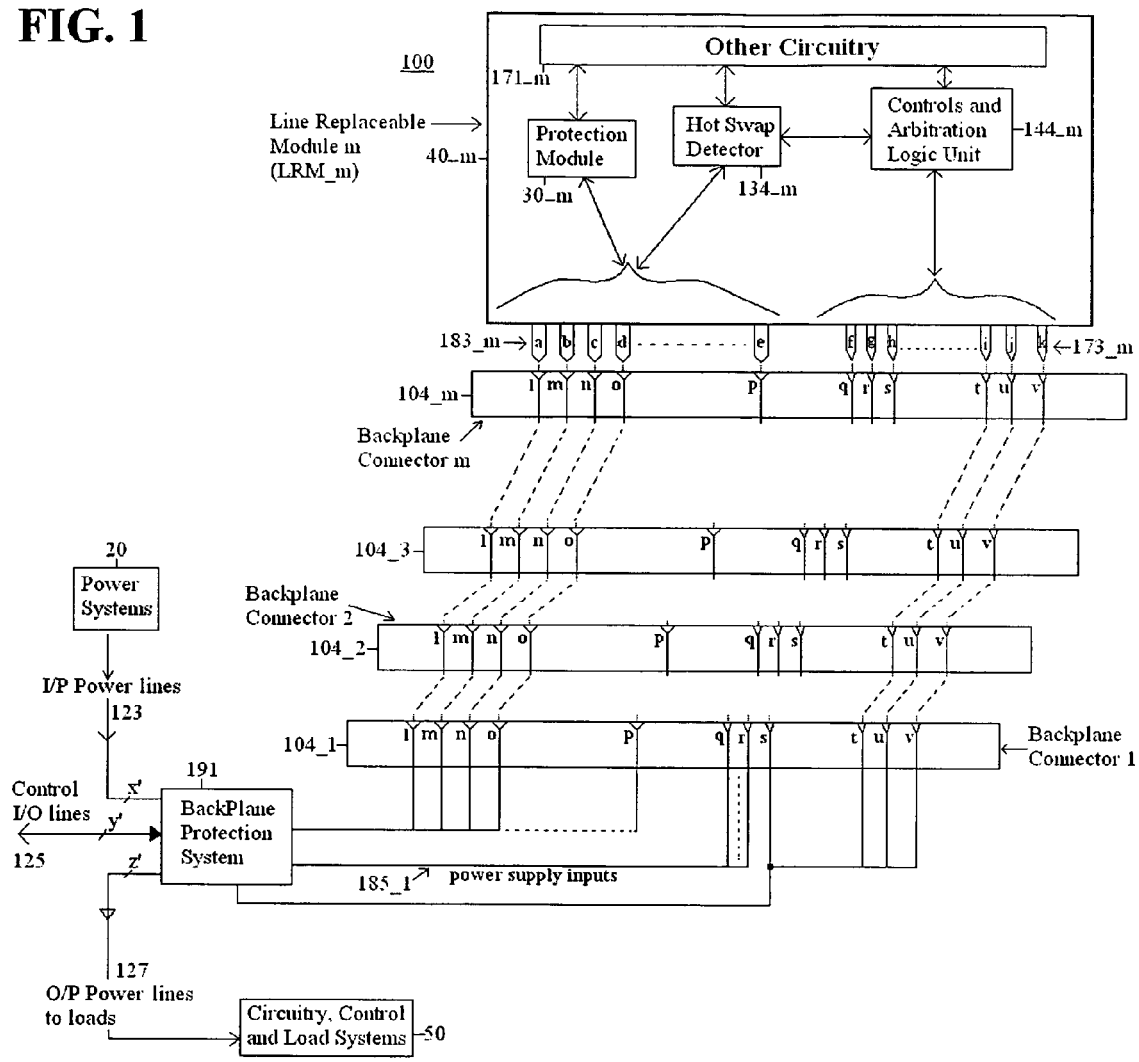
FIG. 1 is a general functional block diagram of a subassembly electrical system containing line replaceable modules (LRMs) with hot-swap capability according to an embodiment of the present invention.

Aspects of the invention are more specifically set forth in the accompanying description with reference to the appended figures. FIG. 1 is a general functional block diagram of a subassembly electrical system containing line replaceable modules (LRMs) with hot-swap capability according to an embodiment of the present invention. The electrical system 100 illustrated in FIG. 1 includes the following components: power systems 20; m line replaceable modules (LRMs) 40_1, ..., 40_m of which LRM 40_m is shown; circuitry, control and load systems 50; m backplane connectors 104_1, 104_2, ..., 104_m; and a backplane protection system 191. Operation of the electrical system 100 in FIG. 1 will become apparent from the following discussion.

LRM 40_m includes a protection module 30_m; a hot swap detector 134_m; other circuitry 171_m; a controls and arbitration logic unit 144_m; and pin systems 183_m and 173_m. Backplane connector 104_m includes pin systems that connect/disconnect from LRM 40_m pin systems, when LRM 40_m is inserted/extracted from backplane connector 104_m. Backplane connectors 104_1, 104_2, 104_3, etc. also connect or disconnect from LRMs 40_1, 40_2, 40_3, etc. (not shown). Other circuitry 171_m includes electronic and electric components of line replaceable module 40_m, such as transistors, resistors, connectors, switches, etc. Hot swap detector 134_m, protection module 30_m, and pin system 183_m perform hot swap protection functions during insertion or extraction of LRM 40_m. Controls and arbitration logic unit 144_m communicates with hot swap detector 134_m and with other circuitry 171_m.

Replaceable modules 40_1, 40_2, ..., 40_m can be connected to and separated from backplane connectors 104_1, 104_2, ..., 104_m, which provide electrical power to replaceable modules. Some LRMs may connect to two backplane/motherboard connectors, one connector for power-pins and one for low voltage power supply input and discrete I/O lines for controls, signal sensing, etc.

Power-in or power-out lines and other discrete signals may first be routed to the motherboard/backplane connectors. Then, when one LRM is attached to the corresponding mating backplane connector, proper power, control and power supply lines are connected from the backplane to the proper connector pins on the LRM, establishing the right connections (achieved by design) to get the desired functionality provided by that particular LRM.

Backplane connectors 104_1, 104_2, ..., 104_m connect to backplane protection system 191. Backplane protection system 191 includes electric and electronic components such as switches, fuses, circuit breakers, resistors, etc., for protection of the backplane connectors. Input I/P power lines 123 lead into backplane protection system 191 and provide power from power systems 20. Control I/O lines 125 transport control I/O data in and out from backplane protection system 191, hence communicating control I/O data to replaceable modules 40_1, 40_2, ..., 40m. Output O/P power lines 127 leave backplane protection system 191 and connect to circuitry, control and load systems 50.

Protection module 30_m protects replaceable module 40_m and backplane connector 104_m from in-rush currents during insertion of replaceable module 40_m into the backplane connector 104_m and electrical system 100, and from transient voltages and current chopping during extraction of replaceable module 40_m from backplane connector 104_m and electrical system 100. Protection module 30_m performs protection functions together with pin system 183_m. Inside replaceable module 40_m, protection module 30_m protects other circuitry 171_m. Protection module 30_m also protects the power systems 20, the circuitry, control and load systems 50, during hot swap of replaceable module 40_m. Protection module 30_m protects components of electrical system 100 during hot swap insertion or removal of replaceable module 40_m under normal or faulty modes of operation for high voltage DC and AC systems without the need to disconnect power. Protection modules 30_m permits safe and reliable insertion and removal of different types of LRMs during hot swap, without disturbing, damaging, or degrading up/downstream adjacent LRMs and subsystems of electrical system 100. Protection module 30_m also helps high voltage AC and DC load management LRMs to control the flow of electrical power to internal and external circuitry/loads and achieve proper protection of SSSDs or the wiring system.

Electrical system 100 may be associated with an aircraft, a more electric aircraft, a ship, a laboratory facility, an industrial environment, etc. The power systems 20 provide electrical energy in electrical system 100. The power systems 20 may include multiple power supply inputs, for redundancy. The power systems 20 may include AC and DC power supplies, electrical components such as transformers, inductances, resistances, etc. The power systems 20 may provide high DC or AC voltages or low DC or AC voltages to replaceable modules 40_1, 40_2, ..., 40_m. Power systems 20 may provide and replaceable modules may use various AC voltages, such as, for example, 115V or 230V or higher, with fixed frequencies (such as, for example, 50/60 Hz or 400 Hz), or variable frequencies (such as, for example 360-800 Hz for aerospace applications), or DC voltages such as, for example, 28V or 270V. The power of replaceable module 40_m may depend on the number of channels, as well as current rating and voltage of each channel.

Replaceable modules 40_1, 40_2, ..., 40_m receive electric power from power systems 20. Replaceable modules 40_1, ..., 40_m may be AC or DC Line Replaceable Modules (LRMs), cards, PC boards, etc. Replaceable modules 40_1, 40_2, ..., 40_m may be high voltage AC and DC LRMs. Replaceable modules 40_1, 40_2, ..., 40_m may have on-board Solid State Switching Devices (SSSDs). Replaceable modules 40_1, 40_2, ..., 40_m may be high voltage Solid State AC and DC switches, referred to in the industry as Solid State Remote Power Controllers (SSPCs). Replaceable modules 40_1, 40_2, ..., 40_m may be various types of LRMs such as: Power Supplies (PS-LRM), Digital Controllers (DC-LRM), AC Solid-State-Remote-Controller (AC-SSPC-LRM), DC Solid-State-Remote-Controller (DC-SSPC-LRM), LRMs used for aircraft platforms and More Electric platforms, PC boards or cards, etc. Solid State AC and DC switches can be used with a wide range of powers, from a few Watts to hundreds of KWatts. Replaceable modules 40_1, 40_2, . . . , 40_m including AC and DC Solid State Switching Devices (SSSDs) may manage high voltage AC and DC powers and loads, and may control the flow of electrical power to internal and external circuitry/loads, to achieve proper protection based on $i^2 \cdot t$ (instantaneous overcorrect protection for large currents and proportionally time-delayed overload protection for smaller currents) to protect the SSSDs or the wiring system.

Circuitry, control and load systems 50 receive electrical power through the replaceable modules, and use the electrical power downstream. Circuitry, control and load systems 50 may include various electrical systems, such as systems on an aircraft or ship, navigation systems, cabin systems, air conditioning systems, etc., systems in an industrial facility such as electrical equipment and tools, etc. Circuitry, control and load systems 50 may include power pins, DC and AC loads, electric circuits using DC and AC power that enable functioning of various services onboard a vehicle, or in a complex environment such as a laboratory facility. Services using AC and DC power may be an electric motor, an automatic braking system, a lighting system of a vehicle, a piece of industrial equipment, etc.

Each LRM among LRMs 40_1, 40_2, . . . , 40_m-1 (not shown) includes a protection module like protection module 30_m of LRM 40_m. Protection modules ensure that hot swap of modules is properly done. Protection modules avoid random pin arcing during mating process of a replaceable module to electrical system 100. Protection modules provide protection for safely inserting a board/module when the board is not electrically initialized, and for safely pulling a board-out while there is current passing through connectors. When electrical system 100 includes integrated systems, protection modules provide hot swap protection beyond local boundaries of the replaceable modules.

When boards/replaceable modules with multiple supply voltages are included in electrical system 100, proper power sequencing for the modules is performed. Protection modules mitigate hot swap effects, so that various bus activities & other operations taking place in electrical system 100 are not disturbed when hot swap of one or more replaceable modules is occurring. Together with control systems of electrical system 100, protection modules help establish autonomy of subsystems in electrical system 100 and automatic system reconfiguration based on the type of replaceable modules extracted or inserted. Information needed to describe the LRM type can be hard-wired through adjustable jumper connectors and/or backed-up by S/W into non-volatile memory locations readable to processor units during LRM initialization.

Replaceable modules 40_1, 40_2, . . . , 40_m and the associated protection modules are designed to provide electrostatic discharge (ESD) protection during hot swap, because electrostatic discharges can disable ports by destroying interface ICs, replaceable modules connections, and surrounding electrostatic sensitive subsystems.

Although the systems in electrical system 100 are shown as discrete units, it should be recognized that this illustration is for ease of explanation and that the associated functions of certain functional modules or systems can be performed by one or more physical elements.

Figure 2:
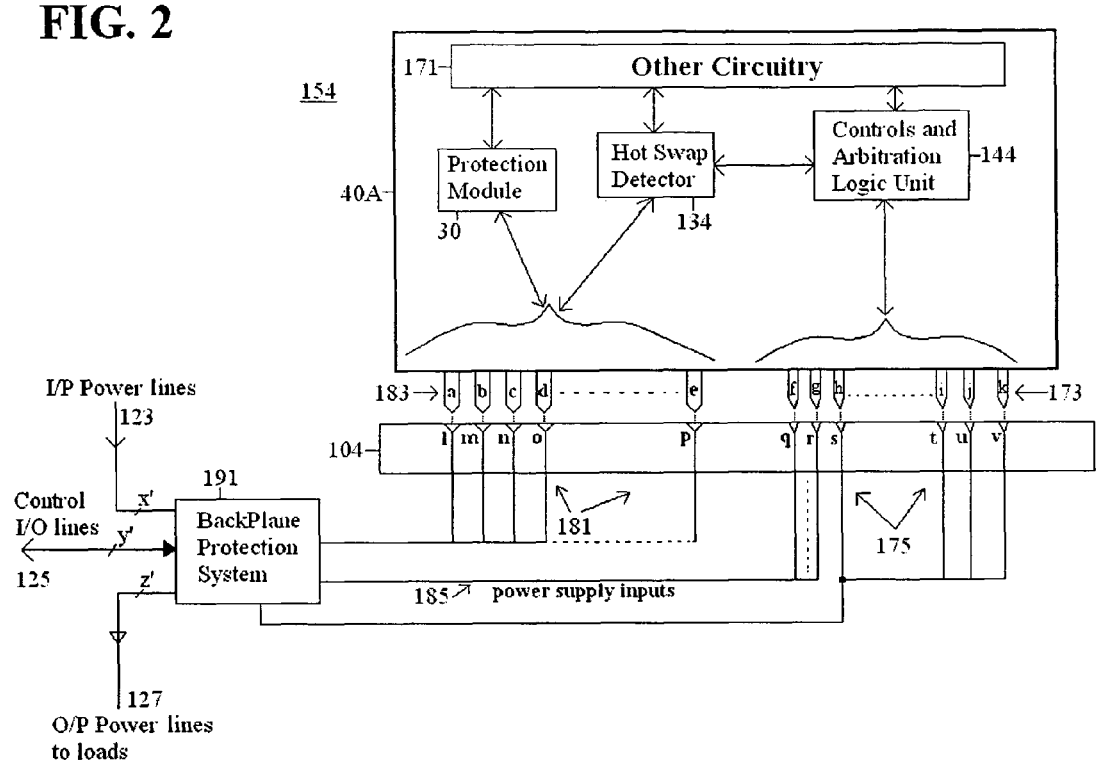
FIG. 2 is a block diagram of an electrical configuration containing a system for hot swap of line replaceable modules according to an embodiment of the present invention.

FIG. 2 is a block diagram of an electrical configuration 154 containing a system for hot swap of line replaceable modules according to an embodiment of the present invention. The electrical configuration 154 illustrated in FIG. 2 includes the following components: a backplane 104; a replaceable module 40A; and a backplane protection system 191. The electrical configuration 154 is included in electrical system 100.

Replaceable module 40A may be a line replaceable module (LRM), and includes: a protection module 30; a hot swap detector 134; other circuitry 171; a controls and arbitration logic unit 144; and pin systems 183 and 173. Backplane 104 includes pin systems 181 and 175. Other circuitry 171 includes electronic and electric components of line replaceable module 40A, such as transistors, resistors, connectors, switches, etc. Hot swap detector 134, protection module 30, and pin system 183 perform hot swap protection functions.

Replaceable module 40A can be connected to and separated from backplane 104, which provides electrical power to replaceable module 40A. Replaceable module 40A connects and separates through pin systems 183 and 173 from backplane 104, at backplane pin systems 181 and 175. Backplane 104 provides electrical power to controls and arbitration logic unit 144 when pin systems 173 and 175 mate. Backplane 104 provides electrical power to protection module 30 and hot swap detector 134 when pin systems 183 and 181 mate.

Pin system 183 includes a number of pins, of which pins a, b, c, d, and e are shown. Pins of pin system 183 connect to protection module 30 and hot swap detector 134. Pin system 173 includes power supply and controls pins, of which pins f, g, h, i, j, and k are shown. Pins of pin system 173 connect to controls and arbitration logic unit 144. Controls and arbitration logic unit 144 also communicates with hot swap detector 134.

Backplane pin system 181 includes power pins of which pins l, m, n, o, and p are shown. Backplane pin system 181 connects to backplane protection system 191. Backplane protection system 191 includes electric and electronic components such as switches, fuses, circuit breakers, resistors, etc., for protection of backplane 104. Input I/P power lines 123 lead into backplane protection system 191. Control I/O lines 125 transport control I/O data in and out from backplane protection system 191, hence communicating control I/O data to replaceable module 40A. Output O/P power lines 127 leave backplane protection system 191 and connect to loads. Backplane pin system 175 includes power supply input pins q and r, and control pins and discrete I/O pins of which pins s, t, u, and v are shown. Power supply input pins q and r connect to backplane protection system 191 through power supply inputs 185. The control pins and discrete I/O pins of backplane pin system 175 also connect to backplane protection system 191.

Protection module 30 protects replaceable module 40A and backplane 104 from in-rush currents during insertion of replaceable module 40A into the backplane 104 and electrical system 100, and from transient voltages and current chopping during extraction of replaceable module 40A from backplane 104 and electrical system 100. Protection module 30 performs protection functions together with pin system 183. Inside replaceable module 40A, protection module 30 protects other circuitry 171.

During insertion or extraction of replaceable module 40A, electrical parameters associated with protection module 30 and pin system 183 change. Hot swap detector 134 includes electronic circuitry (further described in FIG. 3A) that senses changes in electrical parameters associated with protection module 30 and pin system 183. Based on these changes, hot swap detector 134 detects whether a hot swap (insertion or extraction) of replaceable module 40A is being performed or has been completed. Hot swap detector 134 also detects changes in electrical parameters associated with other circuitry 171, changes which may occur during hot swap.

Controls and arbitration logic unit 144 receives reports from hot swap detector 134 about completion of hot swap of replaceable module 40A. When hot swap insertion of replaceable module 40A is completed, controls and arbitration logic unit 144 starts normal control and communication functions inside replaceable module 40A and at control pins and discrete I/O pins in pin system 175.

Figure 3A:
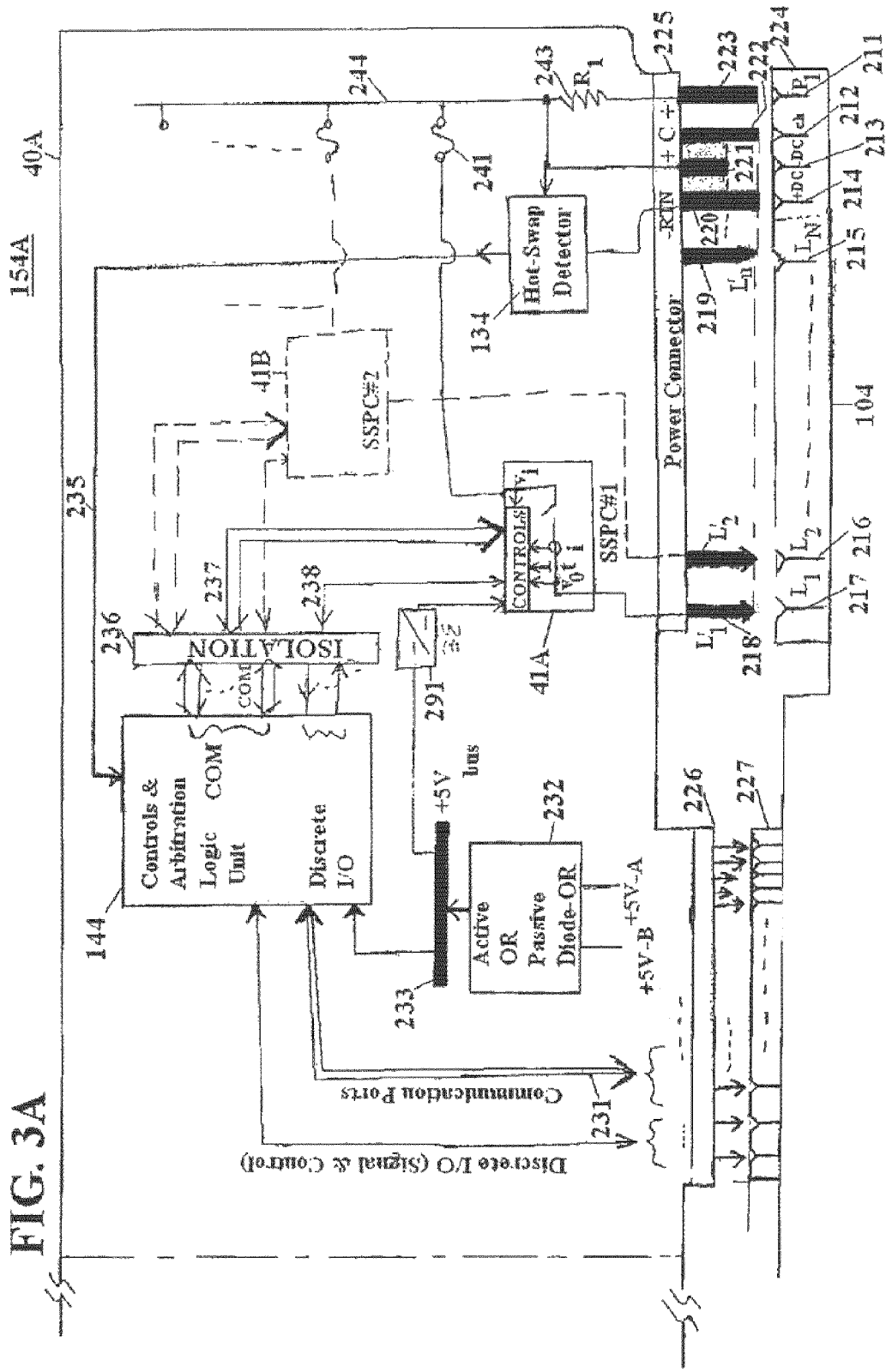
FIG. 3A is a block diagram illustrating an exemplary implementation of a hot swap protection system using short/long pins according to an embodiment of the present invention illustrated in FIG. 2.

FIG. 3A is a block diagram illustrating an exemplary implementation of a hot swap protection system using short/long pins according to an embodiment of the present invention illustrated in FIG. 2. FIG. 3A shows how short/long pin can be used to prevent random pin arcing during the mating process by reducing the DC current during the MAKE (insertion) or BREAK (extraction) process for a DC LRM. Similar methods and apparatus apply for hot swap of AC type LRMs.

FIG. 3A illustrates a DC Solid-State Remote Controller Line Replaceable Module (DC SSPC LRM) 40A included in an electrical configuration 154A. The DC SSPC LRM includes: high voltage Solid State DC switches, which are Solid State Power Controllers (SSPCs); a hot swap detector 134; a control and arbitration logic unit 144; an active or passive diode ORing system 232; a power connector 225, and a second power strip 226; and a plurality of pins connected to the power connectors. A few SSPCs are shown as SSPC#1 (element 41A) and SSPC#2 (element 41B) More SSPCs may be present but are not shown in the picture. The SSPCs are connected to electrical rail 244 through fuses. For example, SSPC#1 41A is connected to electrical rail 244 through fuse 241.

In the circuit shown in FIG. 3A, the control logic voltage is applied first when a DC SSPC LRM is inserted during hot swap. The power pins are applied after the control logic voltage is applied. For protection during hot swap insertion of the DC SSPC LRM, it is desirable that the in-rush current be reduced and the resistance between the DC SSPC LRM and the system in which the LRM is being inserted be gradually decreased.

Power connector 225 connects to male pins 219, 220, 221, 222, and 223. Hot swap detector 134 connects to power connector 225 and bulk capacitors, and to pins 220, 221, and 223. Bulk capacitors are typically present on the DC LRM. SSPC#1 41A also connects to pins 223 and 221. Initially, pin 223 charges the bulk capacitors on the board. Pin 223 then gets shorted-out by pin 221. Hot swap detector 134 detects the hot swap by detecting the voltage on the bulk capacitors, and informs the controls and arbitration logic unit 144, when the hot swap is completed (i.e., board fully inserted). Hot swap detector 134 communicates with the controls and arbitration logic unit 144 through line 235, and reports whether a hot swap is in progress or has been completed. After the hot swap is reported to be complete, controls and arbitration logic unit 144 communicates normally with SSPC#1 41A, through communication port 237 and discrete I/O signal and control port 238, through the isolation section 236. SSPC#1 41A also connects to the power connector 225 at male contact 218 $L'_1$, which connects to the backplane 104 at female contact 217 $L_1$. A second SSPC #2 41B may similarly connect to the controls and arbitration logic unit 144, and to the backplane 104 at contacts $L'_2$ and $L_2$. An Nth SSPC #N may similarly connect to the controls and arbitration logic unit 144, and to the backplane 104 at male contact 219 ($L'_N$) and female contact 215 ($L_N$). The pins 220, 221, 222 and 223 communicate with the backplane 104 at female contacts 214, 213, 212 and 211.

Reverse actions take place when a board is being pulled-out. For protection during hot swap extraction of a DC SSPC LRM, it is desirable that current chopping and transient voltages be avoided, with the resistance between the LRM and the system from which the LRM is extracted being gradually increased. Before physical break between the connector pins, the current through the pins is significantly reduced by resistor RI (element 243). Resistor R1 243 connects to SSPC#1, SSPC#2, etc., through line 244. Hence, the assembly of pins 220, 221, 222, and 223 and the resistor R1 243 perform hot swap protection. Resistor R1 243 connects to hot swap detector 134 as well, and hot swap detector 134 detects when extraction of SSPC #1 has been completed. Resistor R1 243 also contributes to detection of LRM insertion by hot swap detector 134.

Block 232 provides passive or active diode ORing of a redundant power supply input from multiple power sources for the control power supply of the LRM. Block 232 allows connection of multiple power supply voltage inputs to realize a fault tolerant power supply bus for the LRM. Block 232 includes an integrated active-diode-OR circuit which provides soft power-up/down capability, avoids excessive power losses and voltage drops, and controls voltage/current transients and in-rush OR current chopping during LRM insertion/extraction respectively. Additional details about the passive or active diode ORing block 232 can be found in co-pending non-provisional application titled "Method and Apparatus for Integrated Active-Diode-ORing and Soft Power Switching" filed concurrently herewith, the entire contents of which are hereby incorporated by reference. Passive or active diode ORing block 232 connects to a 5V bus 233, which also connects to SSPC#1, and to the other SSPCs present on the DC SSPC LRM. Passive or active diode ORing block 232 communicates with controls and arbitration logic unit 144 at a discrete I/O port.

Unit 291 provides regulated DC-DC power conversion. In one exemplary implementation, unit 291 provides regulated DC-DC power conversion from 5V-to-5V, or from 5V-to-3.5V, etc. Unit 291 may also provide isolation if required.

The motherboard/backplane includes sections 227 and 224. The mating connectors 217, 216, 215, 214, 213, 212 and 211 in section 224 are part of the motherboard/backplane and are fixed. The mating connectors in the backplane section 227 are also fixed. DC SSPC LRM) 40A can be inserted or extracted from the motherboard/backplane.

As shown in FIG. 3A, the short/long pin arrangement is used for detection and proper mitigation of hot swap during insertion or extraction of LRM/boards. This arrangement eliminates in-rush currents during the initial insertion of a board/module with all bulk/bypass capacitors at zero volts.

The short/long pin arrangement illustrated in FIG. 3A also prevents current chopping when a board/LRM is pulled-out while there is a load current, in a normal or fault situation. Hence, the protection circuit shown in FIG. 3A prevents current chopping and also eliminates large transient voltages due to inductive current variations Ldi/dt. Pulling a board out without the hot swap protection while there is inductive current passing through connector pins may cause current chopping which results in arcing and excessive voltage/current transients. Inductive current may be due to on-board inductive filters or inductive loads, for example. Arcing and excessive voltage/current transients can have severe safety consequences due to risk of voltage shock to personnel or to other subsystems during failure modes or faulty conditions, such as short circuit conditions.

Figure 3B:
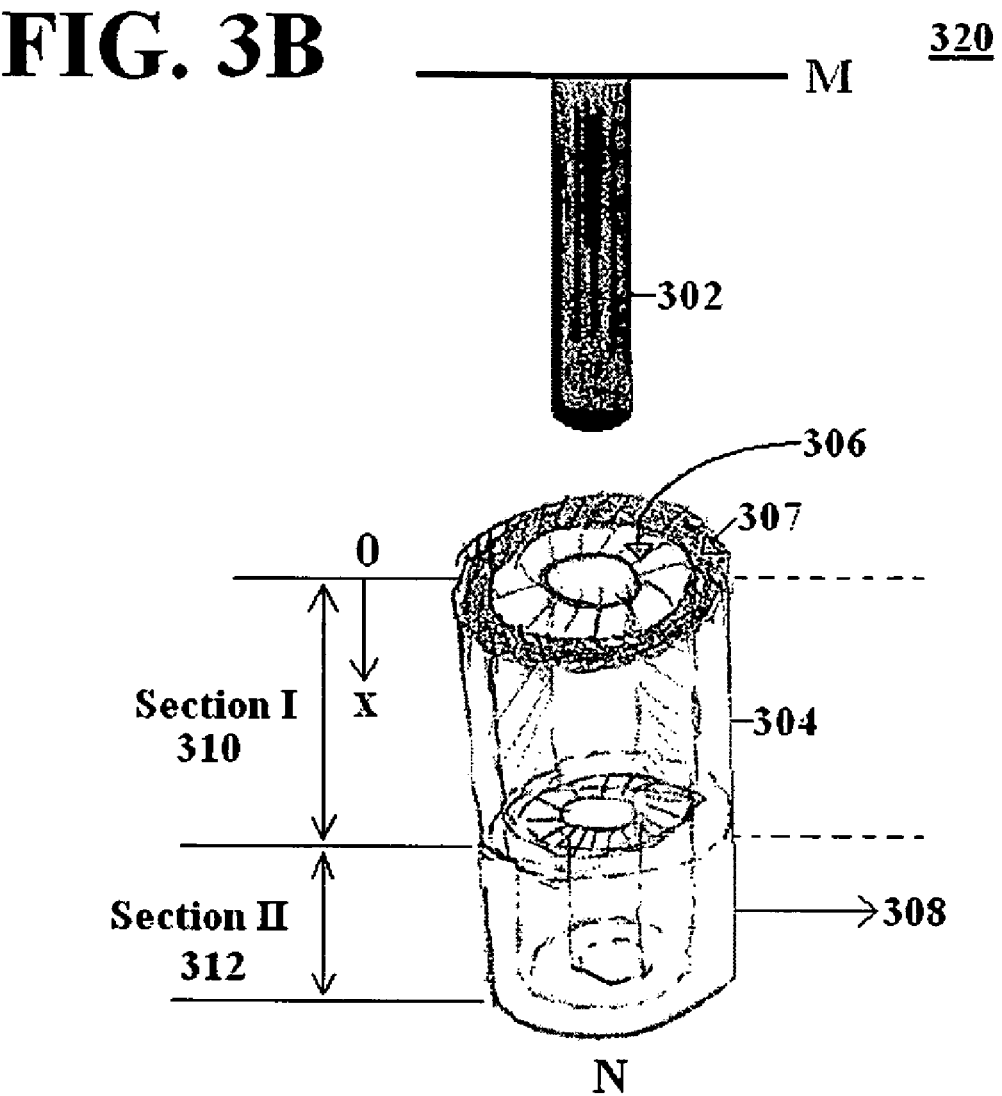
FIG. 3B illustrates a pin arrangement for hot swap that reduces the number of pins and integrates a hot swap resistor into the pin arrangement according to an embodiment of the present invention illustrated in FIG. 2.

FIG. 3B illustrates a pin arrangement 320 for hot swap that reduces the number of pins and integrates a hot swap resistor into the pin arrangement according to an embodiment of the present invention illustrated in FIG. 2.

In FIG. 3B an alternative method of hot swap pin arrangement is shown. Pin 304 has two sections, section I (310) and section II (312). Section I (310) comprises an inner resistive cylinder 306 placed in a protective insulating sheet 307. Section II (312) comprises a conductive shell 308. As the solid male pin conductor 302 is inserted into the female pin 304, the resistance of the pin arrangement 320 between points M and N is initially high, and then starts decreasing as the solid male pin conductor 302 travels inside through section I (310) of the female pin 304. When the solid male pin conductor 302 is fully inserted in the female pin 304, the resistance of pin arrangement 320 becomes zero, as the conductive shell 308 of section II (312) shorts out the resistance of section I (310). The resistive section I (310) performs the functions of hot swap resistor R1 243 from FIG. 3A.

The resistance of pin arrangement 320 decreases from a maximum resistance R=Rmax (when male pin conductor 302 touches section I of female pin 304) to R=0 (when male pin conductor 302 touches section II of female pin 304) and remains zero as the male pin conductor 302 continues to travel through section II of female pin 304. Hence, the initial resistance R=Rmax of pin arrangement 320 reduces the in-rush current when an LRM is inserted into a backplane and connected to the male pin conductor 302. When an LRM is extracted from a backplane, the resistance of the pin arrangement 320 gradually increases as male pin conductor 302 travels out of the female pin 304, and interruption current due to LRM extraction is reduced to a safe amount for the LRM and other subsystems of electrical system 100.

In other aspects of embodiments of FIGS. 3A and 3B, the process of long/short pin can be extended to multiple pins and accompanying resistors to achieve a more uniform hot swap in a discrete fashion. For example, a long/medium/short pin system can be used, with two accompanying resistors, R1 and R2, to obtain an additional level of protection during hot swap.

Figure 4:
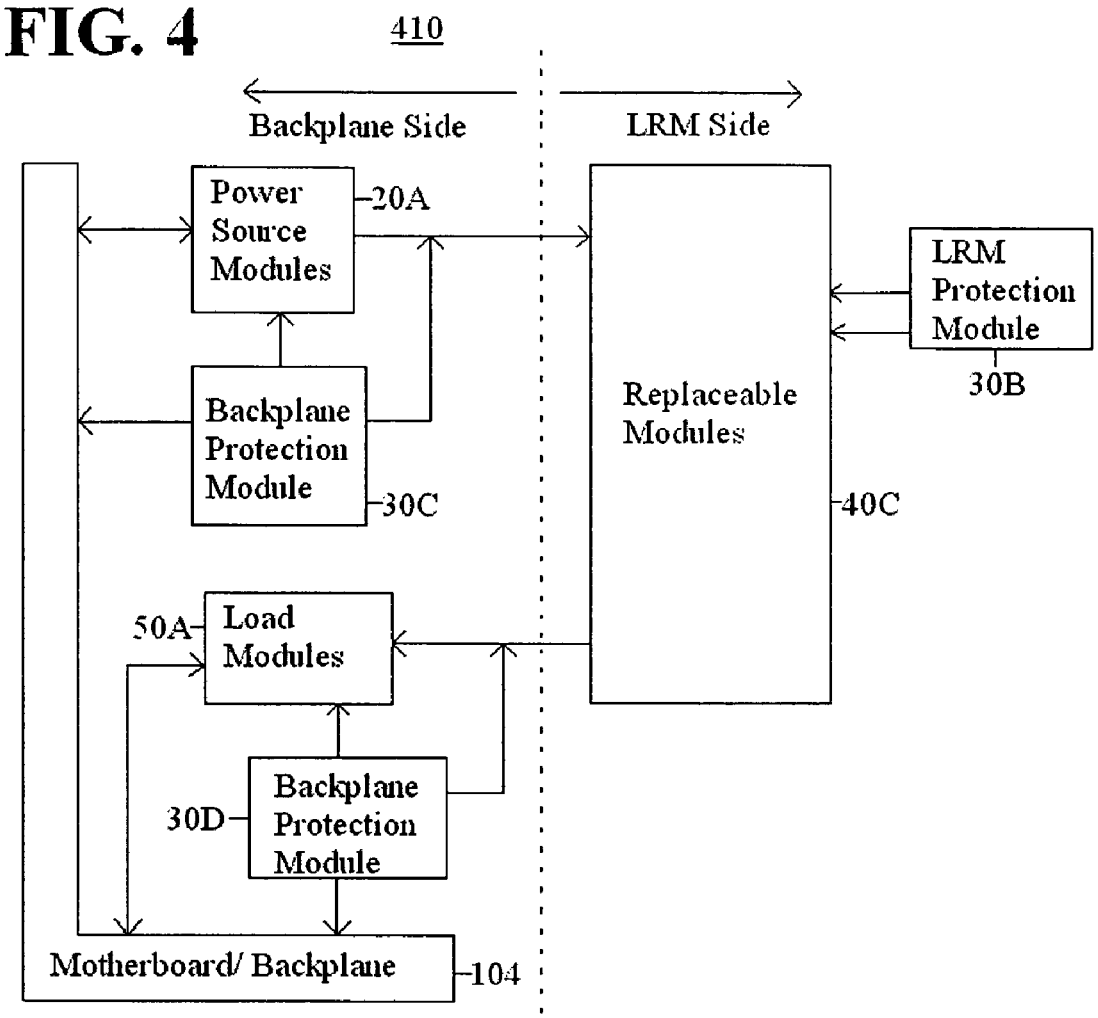
FIG. 4 is a block diagram of an electrical configuration containing a system for hot swap of line replaceable modules according to a second embodiment of the present invention.

FIG. 4 is a block diagram of an electrical configuration 410 containing a system for hot swap of line replaceable modules according to a second embodiment of the present invention. Electrical configuration 410 is included in electrical system 100. The electrical configuration 410 illustrated in FIG. 4 includes the following components: power source modules 20A; load modules 50A; replaceable modules 40C with LRM protection module 30B; backplane protection modules 30C and 30D; motherboard protection module 30D; and motherboard/backplane 104. Power source modules 20A are included in power systems 20 of FIG. 1. Load modules 50A are included in circuitry, control and load systems 50 of FIG. 1.

LRM protection module 30B protects replaceable modules 40C during hot swap. LRM protection module 30B may be included in replaceable modules 40C. Backplane protection module 30C protects power source modules 20A during hot swap of replaceable modules 40C. Backplane protection module 30D protects load modules 50A during hot swap of replaceable modules 40C. Backplane protection modules 30D and 30C also protect the motherboard/backplane 104.

Figure 5A:
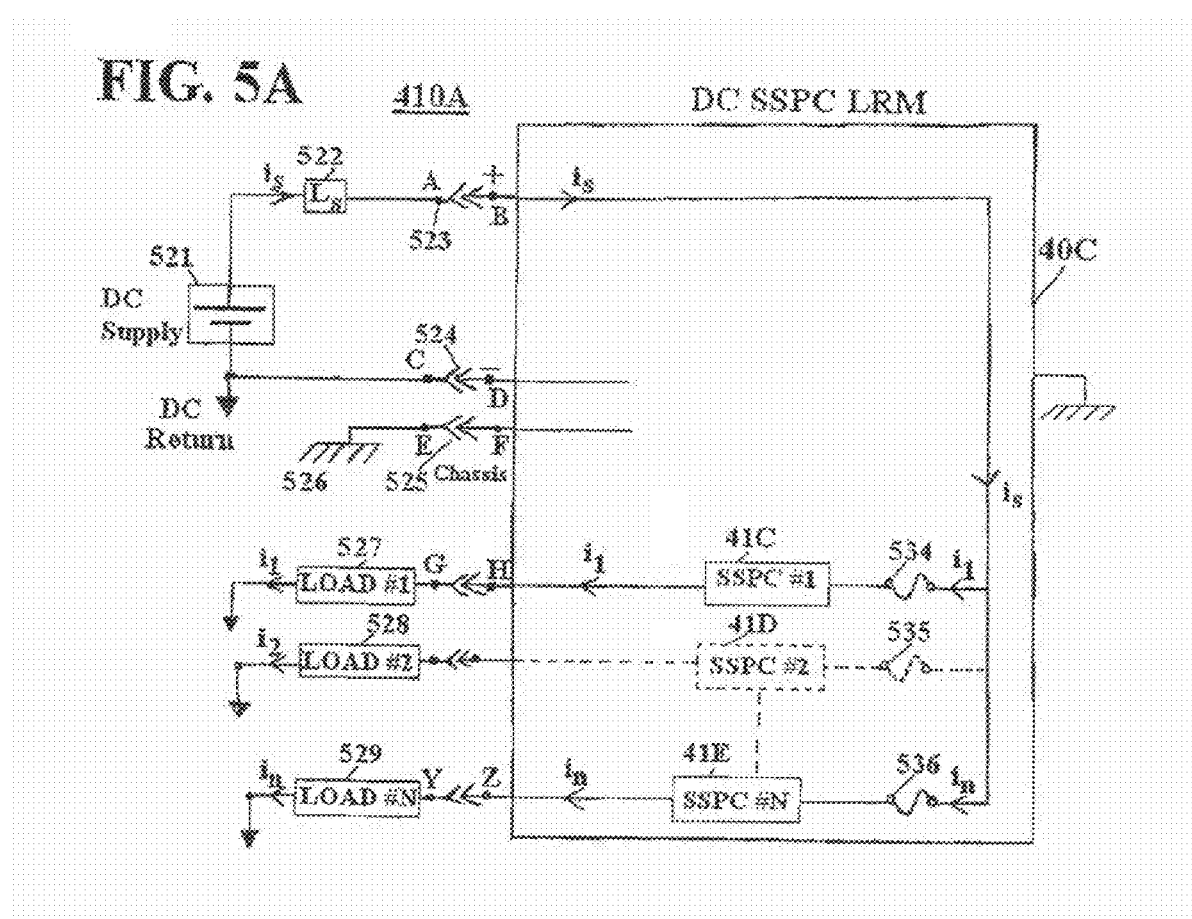
FIG. 5A illustrates a DC SSPC LRM without hot swap protection circuits.

FIG. 5A illustrates a DC SSPC LRM without hot swap protection circuits. The system 410A in FIG. 5A includes a DC SSPC LRM 40C, a front end DC source circuit, and a plurality of loads.

The front end DC supply 521 generates the current $i_S$, which passes through front end inductance $L_S$ 522 and through the joined connectors A and B (523). Joined connectors C and D (524) provide DC return for the DC current. Joined connectors E and F (525) provide a ground connection for DC SSPC LRM 40C, at chassis ground 526. The current $i_S$ then passes through the DC SSPC LRM 40C where it splits into components $i_1, i_2, \ldots, i_n$ that pass through a plurality of SSPCs. SSPC#1 41C, SSPC#2 41D, ..., SSPC#N 41E.

SSPC#1 41C, SSPC#2 41D, ..., SSPC#N 41E are connected inside DC SSPC LRM 40C through fuses 534, 535, ..., 536.

Currents $i_1, i_2, \ldots, i_n$ from SSPC#1, SSPC#2, ..., SSPC#N leave the DC SSPC LRM 40C on the load side, and then pass through load inductances Load#1 527, Load#2 528, ..., Load#N 529, and on to other modules which use the currents $i_1, i_2, \ldots, i_n$. Joined connectors G and H, ..., Y and Z connect the load inductances Load#1 527, Load#2 528, ..., Load#N 529 to the DC SSPC LRM 40C.

Joined connectors A and B, C and D, E and F, G and H, ..., Y and Z are disconnected when DC SSPC LRM 40C is extracted from the system 410A.

The chassis 526 is a hard cover LRM chassis at ground potential that provides electrostatic discharge (ESD) protection during hot swap of DC SSPC LRM 40C. ESD can occur when: a charged body touches an IC; a charged IC touches a grounded surface; a charged machine touches an IC; or an electrostatic field induces a voltage across a dielectric that is sufficient to break the dielectric down. The hard cover LRM chassis 526 at ground potential provides proper ESD protection during hot swap of DC SSPC LRM 40C.

Figure 5B:
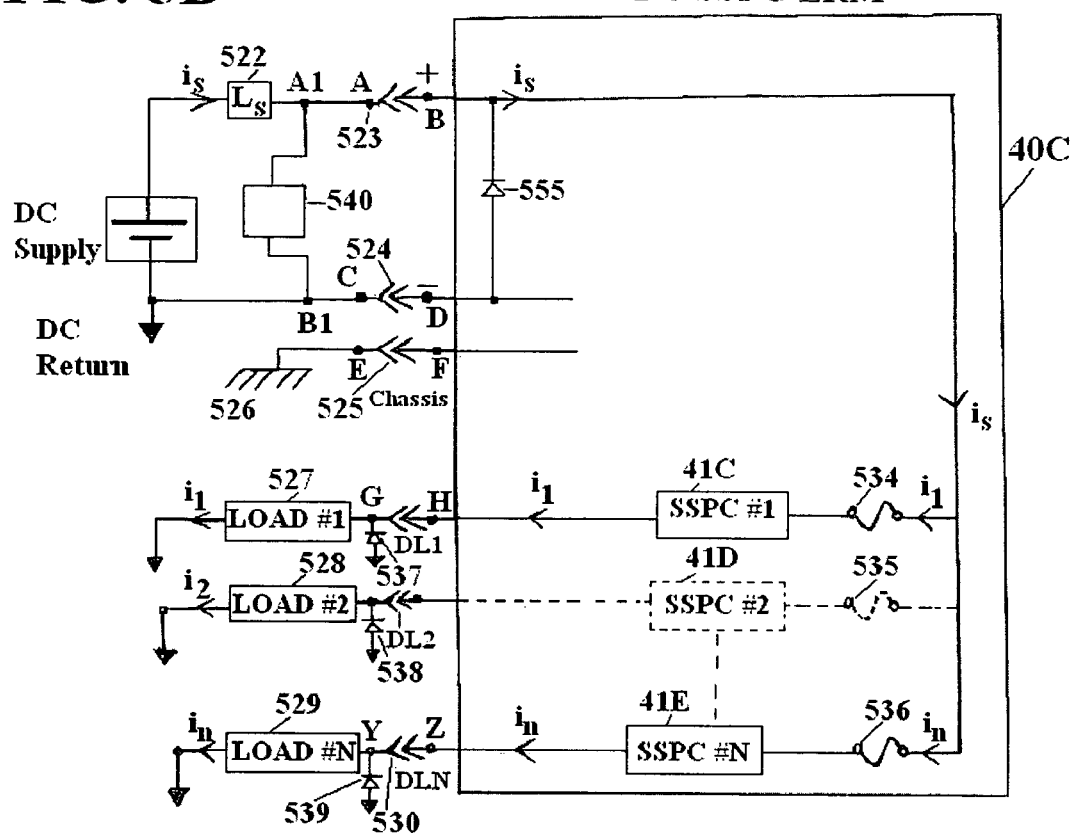
FIG. 5B is a block diagram illustrating an exemplary implementation of hot swap protection for a DC SSPC LRM according to a second embodiment of the present invention illustrated in FIG. 4.

FIG. 5B is a block diagram illustrating an exemplary implementation of hot swap protection for a DC SSPC LRM 40C according to a second embodiment of the present invention illustrated in FIG. 4. FIG. 5B shows the DC SSPC LRM 40C from FIG. 5A, with hot swap protection circuits.

Hot swap protection circuits in FIG. 5B are implemented for capturing stored energy in the front end inductance $L_S$ 522 and in load inductances Load#1 527, Load#2 528, ..., Load#N 529, when the DC SSPC LRM board 40C is extracted under load, or when one or more of the controlled SSSD devices included in DC SSPC LRM board 40C have failed short.

Hot swap protective block 540 has been introduced in FIG. 5B at the front-end supply end between electrical lines AB and CD. Hot swap protective block 540 may include standard RC snubbers, surge protection devices, or the exemplary circuit shown in FIG. 5C, to mitigate the current chopping problem on the board side caused by the front end inductance 522. Hot swap protective block 540 protects the mother board and the front-end supply side. A free-wheeling diode 555 has also been introduced at the front end side of the circuit in FIG. 5B for protection of the front-end circuit side during hot swap.

When the current through front end inductance $L_S$ 522 changes, as happens during extraction of the DC SSPC LRM 40C, front end inductance $L_S$ 522 starts acting as a source producing voltage Ldi/dt. Free wheeling diode 555 and hot swap protective block 540 steer the current/voltage transients due to front-end inductance $L_S$ 522 through diode 555 and hot swap protective block 540, so that excessive voltage/current transients do not pass through and damage the DC SSPC LRM 40C or the front end supply side. Hence, hot swap protective block 540 and free-wheeling diode 555 protect the mother board and front-end supply side.

Free-wheeling diodes DL1 537, DL2 538, ..., DLN 539 are introduced for the protection of the load-side connectors. Free-wheeling diode DL1 537 protects the SSPC#1 41C and the load inductance Load#1 527 from current/voltage transients generated during hot swap; free-wheeling diode DL2 538 protects the SSPC#2 41D and the load inductance Load#2 528; and so on, for all N SSPCs and loads.

Figure 5C:
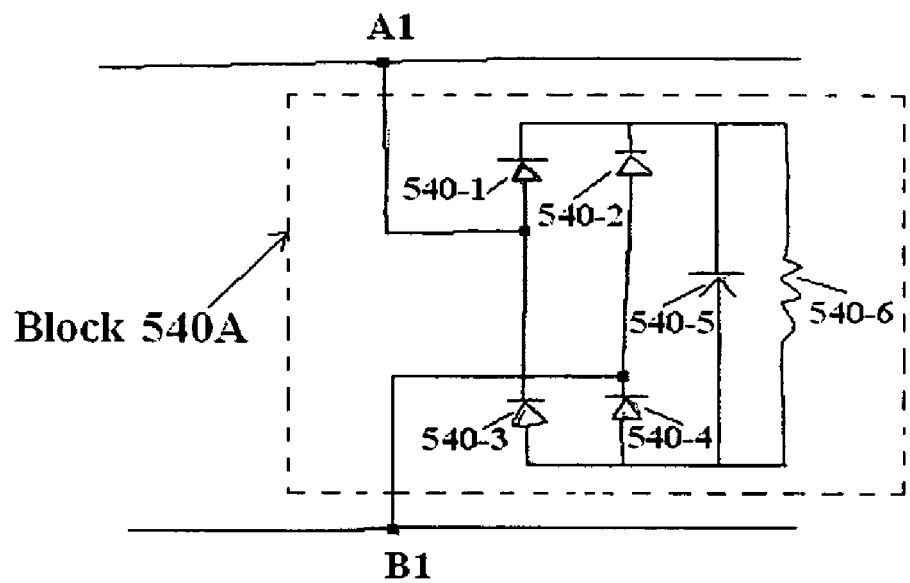
FIG. 5C illustrates in more detail a hot swap protection block for use with a DC SSPC LRM according to a second embodiment of the present invention illustrated in FIG. 5B.

FIG. 5C illustrates in more detail the hot swap protection block 540 for use with DC SSPC LRM 40C according to a second embodiment of the present invention illustrated in FIG. 5B. Hot swap protection block 540A includes diodes 540_1, 540_2, 540_3, 540_4, a capacitor 540_5, and a resistor 540_6. Hot swap protection block 540A connects to lines AB and CD in the circuit shown in FIG. 5B. Protection block 540A steers currents generated during hot swap by inductance $L_S$ 522, through resistor 540_6 so that such currents do not circulate through the lines going to and coming from DC SSPC LRM 40C. Protection block 540A also applies transient voltages generated during hot swap at the front-end side, to capacitor 540_5 and resistor 540_6 so that such voltages do not cause transient currents on the front-end supply side or through the DC SSPC LRM 40C.

Figure 5D:
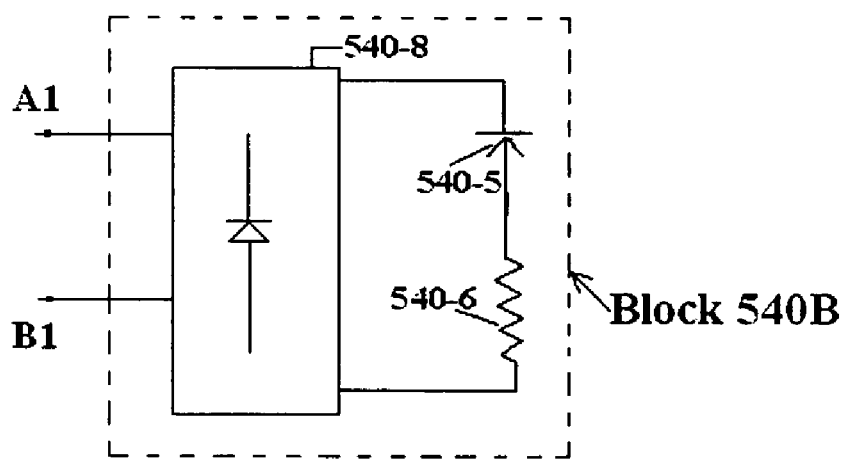
FIG. 5D illustrates in more detail another implementation for a hot swap protection block for use with a DC SSPC LRM according to a second embodiment of the present invention illustrated in FIG. 5B.

FIG. 5D illustrates in more detail another implementation for hot swap protection block 540 for use with DC SSPC LRM 40C according to a second embodiment of the present invention illustrated in FIG. 5B. Hot swap protection block 540B includes diode block 540-8, capacitor 540_5, and resistor 540_6 in series with the capacitor 540_5. Diode block 540-8 includes diodes, which can be arranged in the configuration shown in FIG. 5C, that is, the configuration of diodes 540_1, 540_2, 540_3, 540_4. Hot swap protection block 540B connects to lines AB and CD in the circuit shown in FIG. 5B. The configuration shown in FIG. 5D is advantageous as it eliminates initial power in-rush for the capacitor 540_5 and reduces overall power dissipation as the capacitor 540_5 gets charged up and then current ceases to flow in the resistor 540_6.

Although the hot swap protection systems discussed in FIGS. 5B, 5C and 5D were discussed in the context of a DC SSPC LRM, the hot swap protection systems in FIGS. 5B, 5C and 5D are equally applicable to hot swap protection of other types of modules, circuits, and systems.

Figure 6A:
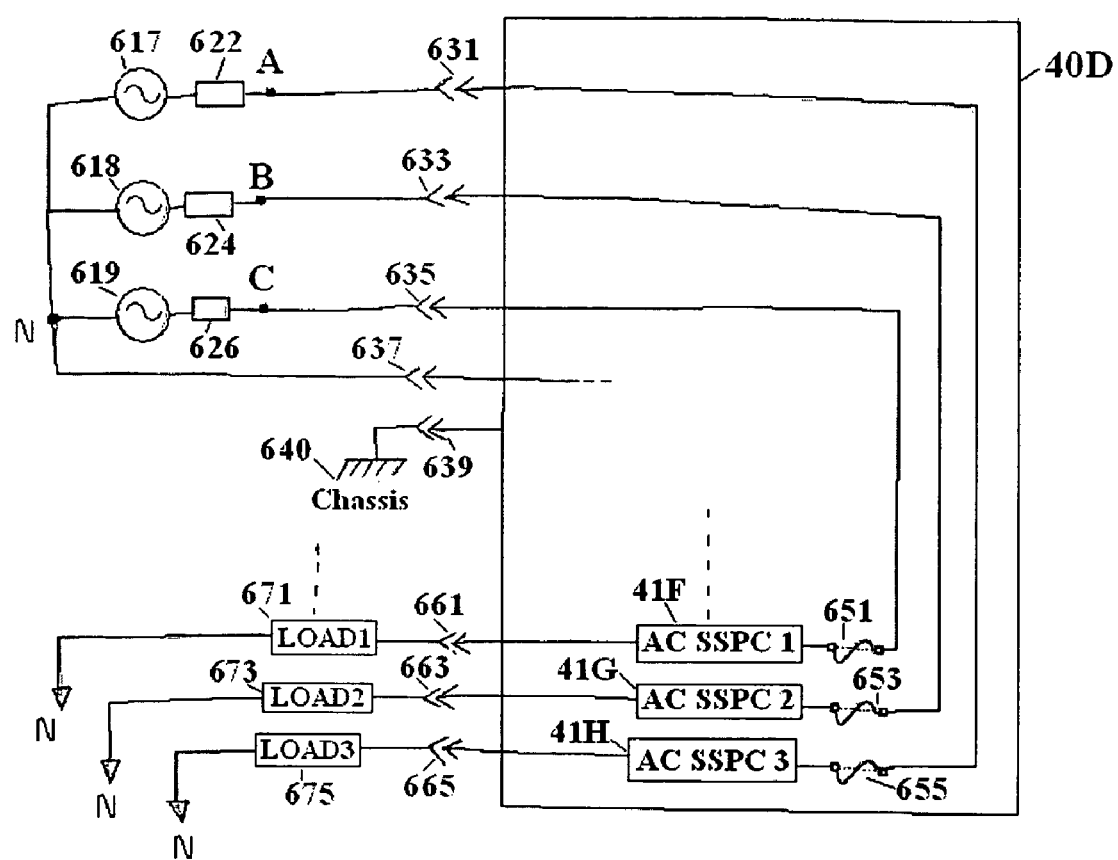
FIG. 6A illustrates an AC SSPC LRM without hot swap protection circuits.

FIG. 6A shows an AC SSPC LRM without hot swap protection circuits. The system 410B in FIG. 6A includes an AC SSPC LRM 40D, a front end AC source circuit, and a plurality of loads.

The front end 3-phase alternating current AC power system 617, 618 and 619 generate AC currents that pass through front end inductances 622, 624 and 626 and through joined connector systems 631, 633, 635 and 637. Joined connector system 639 provides a ground connection for AC SSPC LRM 40D, at the chassis ground 640. The currents from the front-end AC source circuit pass through the AC SSPC LRM 40D to a plurality of SSPCs, namely AC SSPC1 41F, AC SSPC2 41G, and AC SSPC3 41H. AC SSPC1 41F, AC SSPC2 41G, and AC SSPC3 41H are connected inside AC SSPC LRM 40D through fuses 651, 653, and 655.

Currents from AC SSPC1 41F, AC SSPC2 41G, and AC SSPC3 41H leave the AC SSPC LRM 40D on the load side, and then pass through load inductances Load1 671, Load2 673, and Load3 675, and on to other modules which use the currents. Joined connector systems 661, 663, and 665 connect the load inductances Load1 671, Load2 673, and Load3 675 to the AC SSPC LRM 40D.

Joined connectors systems 631, 633, 635, 637, 639, 661, 663, and 665 are disconnected when the AC SSPC LRM 40D is extracted from the system 410B.

Figure 6B:
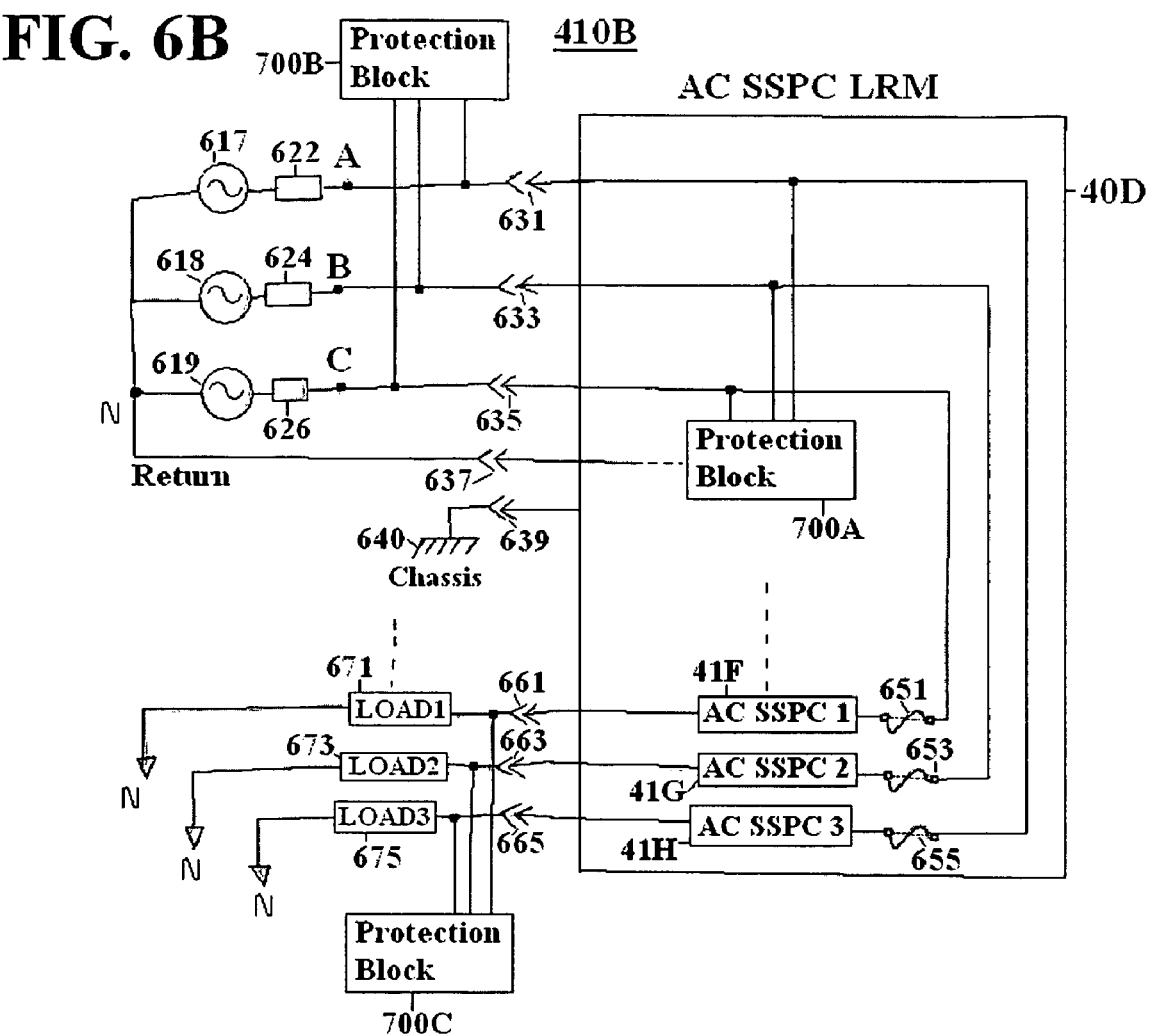
FIG. 6B is a block diagram illustrating an exemplary implementation of hot swap protection for an AC SSPC LRM according to a second embodiment of the present invention illustrated in FIG. 4.

FIG. 6B is a block diagram illustrating an exemplary implementation of hot swap protection for an AC SSPC LRM 40D according to a second embodiment of the present invention illustrated in FIG. 4. FIG. 6B shows the AC SSPC LRM 40D from FIG. 6A, with hot swap protection circuits.

Hot swap protection circuits in FIG. 6B are implemented for capturing stored energy in the front end inductances 622, 624, and 626 and in load inductances Load1 671, Load2 673, and Load3 675, when the AC SSPC LRM board 40D is extracted under load, or when one or more of the controlled SSSD devices included in the AC SSPC LRM board 40D have failed short.

Hot swap protective block 700B has been introduced in FIG. 6B at the front-end supply end at electrical lines A, B and C. Hot swap protective block 700B may include standard RC snubbers, surge protection devices, or the exemplary circuit shown in FIG. 6C, to mitigate the current chopping problem on the board side caused by the front end inductances 622, 624, and 626. Hot swap protective block 700B protects the mother board and the front-end AC source circuit. A second hot swap protective block 700A, similar to block 700B, is introduced into the AC SSPC LRM 40D.

When the currents through front end inductances 622, 624, and 626 change abruptly, as happens during extraction of the AC SSPC LRM 40D, front end inductances 622, 624, and 626 start acting as sources producing voltage Ldi/dt. Hot swap protective blocks 700A and 700B steer the current/voltage transients due to front-end inductances 622, 624, and 626, so that excessive voltage/current transients do not pass through and damage the front-end AC supply side and the AC SSPC LRM 40D. Instead, the current/voltage transients are captured by hot swap protective blocks 700A and 700B.

A hot swap protective block 700C similar to blocks 700A and 700B is introduced for the protection of the load-side connectors. Hot swap protective block 700C protects the AC SSPC1 41F, AC SSPC2 41G, AC SSPC3 41H, and the load inductances Load1 671, Load2 673, and Load3 675 from current/voltage transients generated during hot swap of AC SSPC LRM 40D.

Figure 6C:
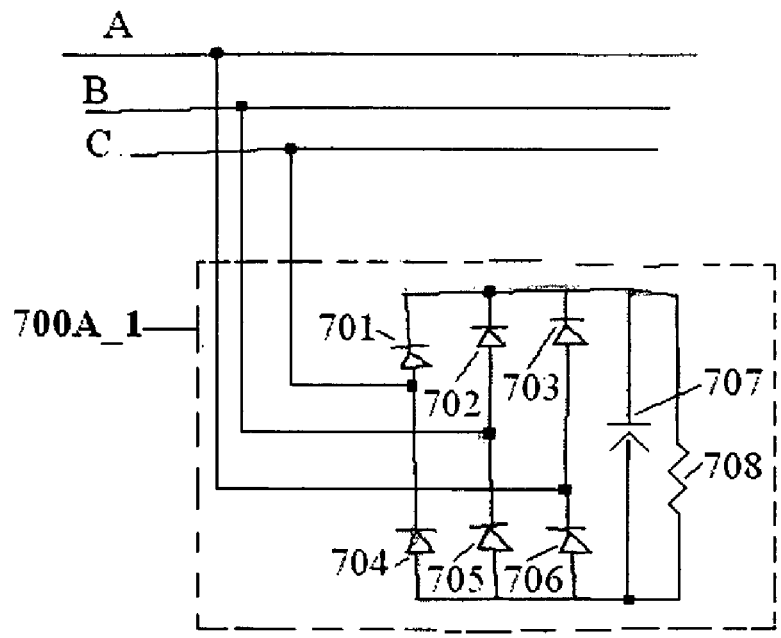
FIG. 6C illustrates in more detail a hot swap protection block for use with an AC SSPC LRM in a three phase system according to a second embodiment of the present invention illustrated in FIG. 6B.

FIG. 6C illustrates in more detail the hot swap protection block 700A for use with AC SSPC LRM 40D in a three-phase system according to a second embodiment of the present invention illustrated in FIG. 6B. The electrical diagram in FIG. 6C for block 700A also describes blocks 700B and 700C from FIG. 6B.

Hot swap protection block 700A_1 in FIG. 6C includes diodes 701, 702, 703, 704, 705, and 706, a capacitor 707, and a resistor 708. Protection block 700A_1 (and similarly protection block 700B) steers currents generated during hot swap by inductances 622, 624, and 626 in FIG. 6B, through resistor 708, so that such currents do not circulate through the lines going to and coming from AC SSPC LRM 40D. Protection block 700A_1 (and 700B) also applies transient voltages generated during hot swap at the front-end side, to capacitor 707 and resistor 708 so that such voltages do not cause transient currents on the front-end AC supply side or through the AC SSPC LRM 40D. Protection block 700C performs the same protective actions on the load side during hot swap of AC SSPC LRM 40D.

Figure 6D:
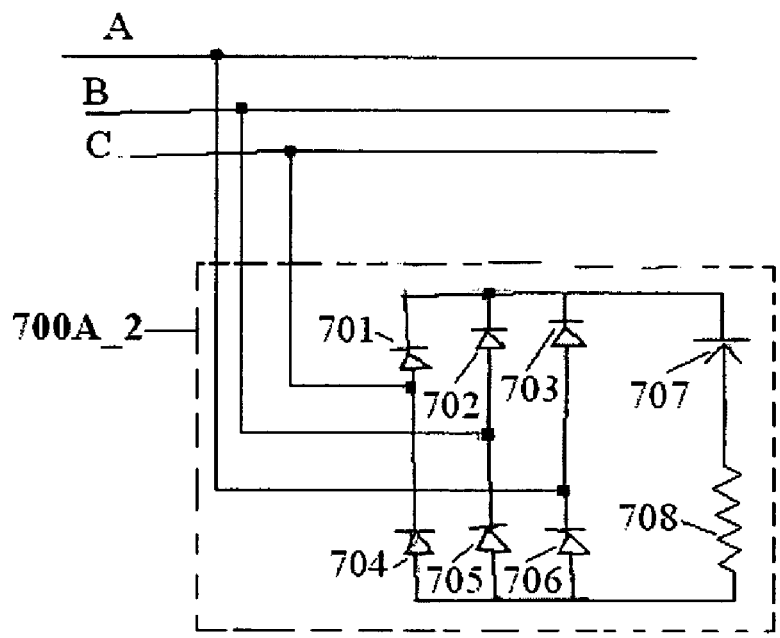
FIG. 6D illustrates in more detail another implementation for a hot swap protection block for use with an AC SSPC LRM in a three phase system according to a second embodiment of the present invention illustrated in FIG. 6B.

FIG. 6D illustrates in more detail another implementation for hot swap protection block 700A for use with AC SSPC LRM 40D in a three phase system according to a second embodiment of the present invention illustrated in FIG. 6B. The electrical diagram in FIG. 6D for block 700A also describes blocks 700B and 700C from FIG. 6B.

Hot swap protection block 700A_2 in FIG. 6D includes diodes 701, 702, 703, 704, 705, and 706, capacitor 707 and resistor 708 in series with the capacitor. The configuration shown in FIG. 6D is advantageous as it eliminates initial power in-rush for the capacitor 707 and reduces overall power dissipation as the capacitor 707 gets charged up and then current ceases to flow in the resistor 708. A similar diagram can be implemented for protection blocks 700B and 700C.

Figure 6E:
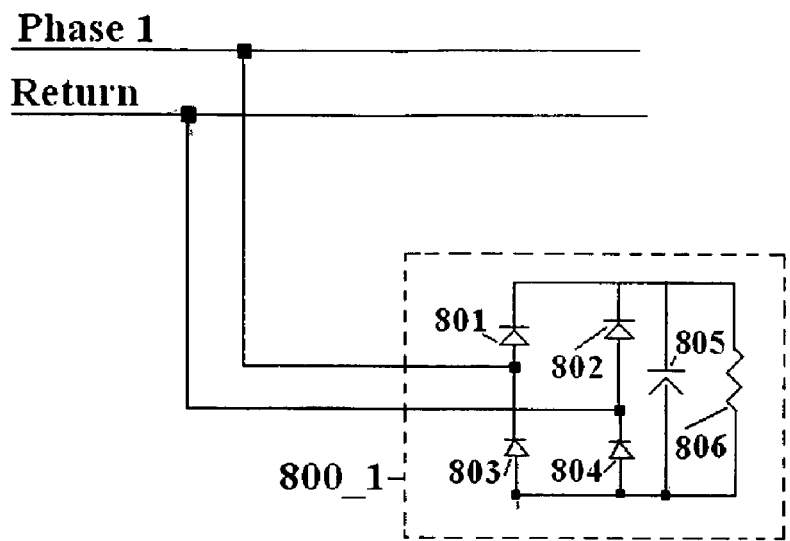
FIG. 6E illustrates in detail a hot swap protection block for use with an AC SSPC LRM in a single phase AC system according to a second embodiment of the present invention illustrated in FIG. 4.

FIG. 6E illustrates in detail a hot swap protection block 800_1 for use with an AC SSPC LRM in a single phase AC system according to a second embodiment of the present invention illustrated in FIG. 4. The hot swap protection block 800_1 is used in an electrical system similar to the electrical system 410B illustrated in FIG. 6B, except that the AC SSPC LRM using the hot swap protection block 800_1 is a single phase system, and the load side of the AC SSPC LRM is also a single phase load.

Hot swap protection block 800_1 includes diodes 801, 802, 803, and 804, a capacitor 805, and a resistor 806. Protection block 800_1 steers currents generated during hot swap at load inductances through resistor 806, so that such currents do not damage the AC SSPC LRM and the load side. Protection block 800_1 also applies transient voltages generated during hot swap at the load side, to capacitor 805 and resistor 806, so that such voltages do not cause transient currents on the load side or through the AC SSPC LRM.

Figure 6F:
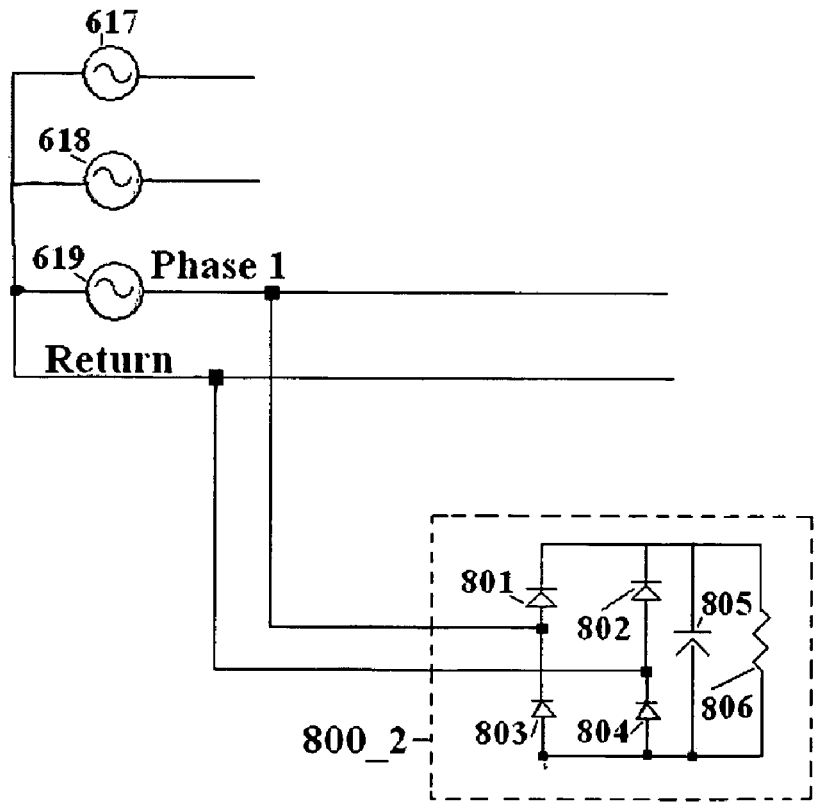
FIG. 6F illustrates in detail a single phase hot swap protection block for use with an AC SSPC LRM in a three phase AC system according to a second embodiment of the present invention illustrated in FIG. 4.

FIG. 6F illustrates in detail a single phase hot swap protection block 800_2 for use with an AC SSPC LRM in a three phase AC system according to a second embodiment of the present invention illustrated in FIG. 4. The protection block 800_2 is similar to protection block 800_1 from FIG. 6E, with the exception that it connects to Phase 1 and Return from FIG. 6B, where Phase 1 passes through one of the alternating current AC power system 617, 618 and 619. Hence, three one-phase protection systems 800_2 can be used for protection during hot swap of three-phase AC SSPC LRM 40D in FIG. 6B.

Figure 6G:
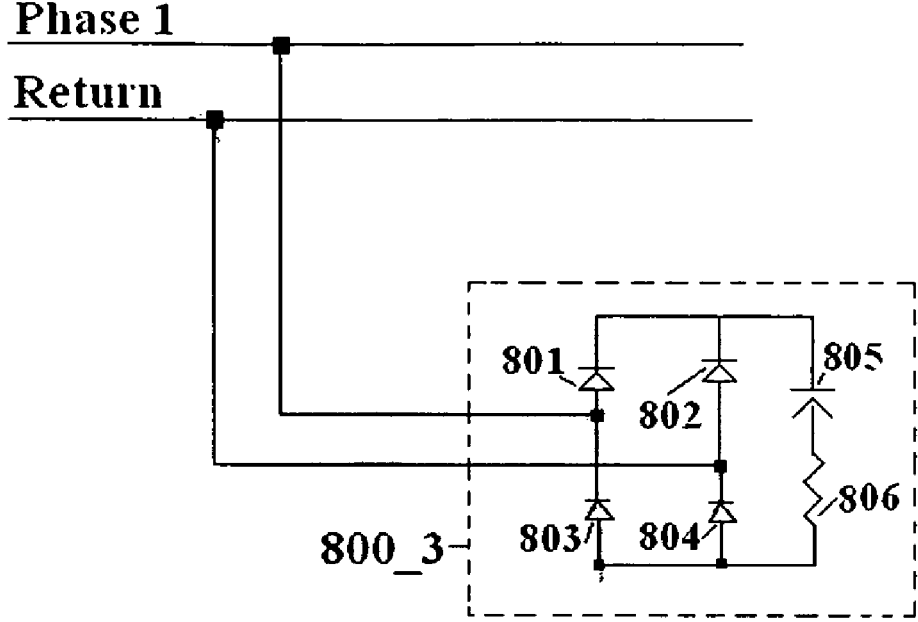
FIG. 6G illustrates in detail another implementation for a hot swap protection block for use with an AC SSPC LRM in a single phase AC system according to a second embodiment of the present invention illustrated in FIG. 4.

FIG. 6G illustrates in detail another implementation for a hot swap protection block for use with an AC SSPC LRM in a single phase AC system according to a second embodiment of the present invention illustrated in FIG. 4.

The hot swap protection block 800_3 is used in an electrical system similar to the electrical system 410B illustrated in FIG. 6B, except that the AC SSPC LRM using the hot swap protection block 800_3 is a single phase system, and the load side of the AC SSPC LRM is also a single phase load. Hot swap protection block 800_3 may also connect to Phase 1 and Return from FIG. 6B, where Phase 1 passes through one of the alternating current AC power system 617, 618 and 619, so that hot swap protection block 800_3 can be used with a three phase system.

Hot swap protection block 800_3 includes diodes 801, 802, 803, and 804, capacitor 805, and resistor 806 in series with the capacitor. The configuration shown in FIG. 6G is advantageous as it eliminates initial power in-rush for the capacitor 805 and reduces overall power dissipation as the capacitor 805 gets charged up and then current ceases to flow in the resistor 806.

Although the hot swap protection systems discussed in FIGS. 6B, 6C, 6D, 6E, 6F and 6G were discussed in the context of an AC SSPC LRM, the hot swap protection systems in FIGS. 6B, 6C, 6D, 6E, 6F and 6G are equally applicable to hot swap protection of other types of modules, circuits, and systems.

The hot swap protection systems discussed in FIGS. 2-6G can be used for hot swap of both low voltage and high voltage modules. The hot swap protection systems discussed in FIGS. 2-6G effectively protect up/down stream subsystems and eliminate electrical current/voltage transients which would otherwise require complete shut-down of the larger electrical system before any hot swap can be achieved. The diode bridges and the free wheeling diode configurations described in FIGS. 5B-6G are particularly useful in hot swap of high voltage modules.

The hot swap methods and apparatuses presented in FIGS. 2-6G can be implemented at three levels: at the level of basic hot swap, at the level of full hot swap, and at the level of highly available hot swap.

During basic hot swap, console intervention signals the electrical system 100 that a card/replaceable module is about to be removed or inserted. If the module is being taken out, the OS can gracefully terminate running software, and then signal the card/module to disconnect itself and power down. The reverse happens when a card/module is inserted in electrical system 100. The card/module may also be enumerated and mapped by electrical system 100.

During full hot swap, the method by which the operating system of electrical system 100 is told of the impending insertion or extraction of a board/module is predefined. A micro-switch attached to the card injector/ejector, or to long/short pin arrangements illustrated in FIGS. 3 and 3A, or to variable resistance pin arrangement illustrated in FIG. 3B, can give an early-warning signal to the system that an operator is about to remove a card. Software and hardware disconnect processes follow the switch activation. The enumeration interrupt can also inform the operating system of the electrical system 100 of the impending event. After the OS has terminated the board's functions, the interrupt signals to the operator that the board/module can be removed. On the other hand, when a new board is installed, the OS can automatically configure the system software of electrical system 100. This signaling method allows the operator to install or remove boards/modules without reconfiguring the system at the console.

During highly available hot swap, a hot swap controller with capacity to reconfigure software in a running system in electrical system 100 is used. Software and hardware components can be reconfigured automatically under application control. Console commands or ejector-switch activation and board/module removal usually unload the driver or install a new driver. By allowing software to control the board's state, both performance and system complexity of electrical system 100 are increased. Control lines to the CPU of electrical system 100 can inform the operating system (OS) that a board/module is present. The OS can then apply power to the board/module. Next, the hardware connection layer indicates that the board is powered up. The master system controller then signals to release the board/module from reset and connects it to the bus. Individual boards/modules can be identified and shut down, and others can be brought up in their place.

The hot swap methods and apparatuses presented in FIGS. 2-6G achieve soft-start and soft-stop to eliminate arcing, random pin arcing, etc. and AC or DC current and v/i transients during the MAKE or BREAK process; eliminate in-rush currents during initial insertion of a board/module with all bulk/bypass capacitors at zero volts; mitigate bus contentions; prevent current chopping when a board is pulled-out when there is a load current (in a normal or fault situation); achieve controlled di/dt or dv/dt transients, for transient currents $i(t) = C(dv/dt)$ and transient voltages $v(t)=L(di/dt)$; eliminate large transient voltages due to $v(t)=L(di/dt)$ and current chopping causing excessive voltage/current transients resulting in severe safety consequences during failure modes; can incorporate circuit breaker functions for additional safety considerations; provide over-load and over-current time-outs; provide fault tolerance for safety considerations; are programmable/adjustable; can be implemented with sequencing control; can be implemented with diagnostics and health monitoring/reporting; mitigate fault challenges including ESD protection; can be integrated into electrical system 100 with a high level of integration in hardware, software and in the operating system; and properly detect the process of a board/LRM insertion or extraction so that S/W is gracefully shut-down to prevent abnormal operation and/or physical damage to sensitive interface circuitry. This type of "prior-to-event" detection prevents disturbance to various discrete signal/control data lines or communication bus activities. Also, proper power sequencing is presented for boards/LRMs with multiple logic power supply voltages and low and high DC voltages (28V, 270V, etc.) and AC sources of power (115V, 230V, FF or WVF). For proper operation of control circuitry, logic power is connected first and disconnected last.

Several aspects of the hot swap protection systems discussed in FIGS. 2-6G can provide redundant functions for hot swap protection during hot swap of modules. The user may choose to implement all, or some, of the hot swap protection functions described in this application, depending on the hot swap protection needs of the system.

Although aspects of the present invention have been described in the context of aerospace applications, it should be realized that the principles of the present invention are applicable to other environments.

I claim:

1. An apparatus for hot swap of AC or DC line replaceable modules, said apparatus comprising:
   a pin assembly, said pin assembly being connectable to a module and connectable to a backplane, said pin assembly
      resistively reducing a current associated with said module during disconnection of said module from said backplane, and
      presenting a high resistance to said module during connection of said module to said backplane, and a low resistance to said module at completion of said connection of said module to said backplane; and
   a hot swap detector connectable to said pin assembly, said hot swap detector detecting said disconnection of said module from said backplane, and detecting said connection of said module to said backplane, wherein:
   said pin assembly comprises a first pin and a second pin,
   said first pin charges bulk capacitors on said module when said module is connected to said backplane, and
   said second pin subsequently shorts out said first pin.

2. The apparatus according to claim 1, wherein said pin assembly comprises
   a variable resistance female pin, and
   a conductive male pin, wherein the resistance of said pin assembly decreases as said conductive male pin is inserted in said variable resistance female pin.

3. The apparatus according to claim 1, wherein said hot swap detector
   detects a voltage change associated with said pin assembly during connection of said module to said backplane and informs a control unit of said connection of said module to said backplane, and
   detects a voltage change associated with said pin assembly during disconnection of said module from said backplane and informs said control unit of said disconnection of said module from said backplane.

4. The apparatus according to claim 1, said apparatus eliminating in-rush current, current chopping, current transients, and voltage transients occurring during hot swap of said module.

5. An apparatus for hot swap of AC or DC line replaceable modules, said apparatus comprising:
   a pin assembly, said pin assembly being connectable to a module and connectable to a backplane, said pin assembly
      resistively reducing a current associated with said module during disconnection of said module from said backplane, and
      presenting a high resistance to said module during connection of said module to said backplane, and a low resistance to said module at completion of said connection of said module to said backplane;
   a hot swap detector connectable to said pin assembly, said hot swap detector detecting said disconnection of said module from said backplane, and detecting said connection of said module to said backplane; and
   a diode ORing system connected to a plurality of power supply voltage inputs, said diode ORing system providing a fault tolerant power supply bus for said module, with soft power-up and power-down capability.

6. An apparatus for hot swap of AC or DC line replaceable modules, said apparatus comprising:
   a first hot swap protection circuit connected to a first electrical line and a second electrical line, wherein said first electrical line and said second electrical line are connectable to a line replaceable module, said first hot swap protection circuit including
      two first line diodes connected to said first line, one of said two first line diodes being forward biased from said first line and the other of said two first line diodes being reverse biased from said first line,
      two second line diodes connected to said second line, one of said two second line diodes being forward biased from said second line, the other of said two second line diodes being reverse biased from said second line, said second line diode forward biased from said second line being connected at a first point to said first line diode forward biased from said first line, and said second line diode reverse biased from said second line being connected at a second point to said first line diode reverse biased from said first line; and
   a free-wheeling diode connected to said line replaceable module, and connectable to said first electrical line and said second electrical line when said line replaceable module is connected to said first electrical line and said second electrical line.

7. The apparatus according to claim 6, further comprising:
   a second hot swap protection circuit connected to a third electrical line and a forth electrical line, wherein said third electrical line and said fourth electrical line said are connectable to said line replaceable module, said second hot swap protection circuit including
      two third line diodes connected to said third line, one of said two third line diodes being forward biased from said third line and the other of said two third line diodes being reverse biased from said third line, and
      two fourth line diodes connected to said fourth line, one of said two fourth line diodes being forward biased from said fourth line, the other of said two fourth line diodes being reverse biased from said fourth line, said fourth line diode forward biased from said fourth line being connected at a third point to said third line diode forward biased from said third line, and said fourth line diode reverse biased from said fourth line being connected at a fourth point to said third line diode reverse biased from said third line,
   wherein
      said line replaceable module is an AC line replaceable module,
      said first electrical line and said second electrical line are associated with a front end side of an electrical system and said first hot swap protection circuit captures stored energy in said front end side during extraction of said AC line replaceable module, and
      said third electrical line and said fourth electrical line are associated with a load side of said electrical system, and said second hot swap protection circuit captures stored energy in said load side during extraction of said AC line replaceable module.

8. The apparatus according to claim 7, further comprising:
a third hot swap protection circuit connected to a fifth electrical line and a sixth electrical line, wherein said fifth electrical line and said sixth electrical line said are included in said AC line replaceable module, said third hot swap protection circuit including
two fifth line diodes connected to said fifth line, one of said two fifth line diodes being forward biased from said fifth line and the other of said two fifth line diodes being reverse biased from said fifth line, and
two sixth line diodes connected to said sixth line, one of said two sixth line diodes being forward biased from said sixth line, the other of said two sixth line diodes being reverse biased from said sixth line, said sixth line diode forward biased from said sixth line being connected at a fifth point to said fifth line diode forward biased from said fifth line, and said sixth line diode reverse biased from said sixth line being connected at a sixth point to said fifth line diode reverse biased from said fifth line.

9. The apparatus according to claim 8, wherein
said AC line replaceable module is a three-phase AC line replaceable module, and
said first hot swap protection circuit further includes two seventh line diodes connected to a seventh line associated with said front end side of said electrical system, one of said two seventh line diodes being forward biased from said seventh line and connected to said first point, and the other of said two seventh line diodes being reverse biased from said seventh line and connected to said second point.

10. The apparatus according to claim 9, wherein
said second hot swap protection circuit further includes two eighth line diodes connected to an eighth line associated with said load side of said electrical system, one of said two eighth line diodes being forward biased from said eighth line and connected to said third point, and the other of said two eighth line diodes being reverse biased from said right line and connected to said fourth point, and
said third hot swap protection circuit further includes two ninth line diodes connected to a ninth line included in said three phase AC line replaceable module, one of said two ninth line diodes being forward biased from said ninth line and connected to said fifth point, and the other of said two ninth line diodes being reverse biased from said ninth line and connected to said sixth point.

11. The apparatus according to claim 8, wherein said first hot swap protection circuit further comprises a first capacitor connected between said first point and said second point, and a first resistor connected between said first point and said second point.

12. The apparatus according to claim 11, wherein
said second hot swap protection circuit further comprises a third capacitor connected between said third point and said fourth point, and a third resistor connected between said third point and said fourth point, and
said third hot swap protection circuit further comprises a fourth capacitor connected between said fifth point and said sixth point, and a fourth resistor connected between said fifth point and said sixth point.

13. The apparatus according to claim 8, wherein said first hot swap protection circuit further comprises a second capacitor and a second resistor, wherein said second resistor is connected in series with said second capacitor, and said second capacitor and said second resistor are connected between said first point and said second point.

14. The apparatus according to claim 13, wherein
said second hot swap protection circuit further comprises a fifth capacitor and a fifth resistor, wherein said fifth resistor is connected in series with said fifth capacitor, and said fifth capacitor and said fifth resistor are connected between said third point and said fourth point, and
said third hot swap protection circuit further comprises a sixth capacitor and a sixth resistor, wherein said sixth resistor is connected in series with said sixth capacitor, and said sixth capacitor and said sixth resistor are connected between said fifth point and said sixth point.

15. The apparatus according to claim 7, further including a free-wheeling diode connected to a third electrical line wherein
said first electrical line and said second electrical line are associated with a front
end side of an electrical system and said first hot swap protection circuit captures stored energy in said front end side during extraction of said line replaceable module,
said third electrical line is associated with a load side of said electrical system,
and
said line replaceable module is a DC line replaceable module connected between said front end side and said load side of said electrical system.

16. A method for hot swap of AC or DC line replaceable modules, said method comprising:
capturing front end stored energy in front end inductances of a front end of an electrical system during exaction of a line replaceable module, said step of capturing front end stored energy using
a first electrical line and a second electrical line of said front end,
two first line front end devices connected to said first line, one of said two first line front end devices being forward biased from said first line and the other of said two first line front end devices being reverse biased from said first line, and
two second line front end devices connected to said second line, one of said two second line front end devices being forward biased from said second line, the other of said two second line front end devices being reverse biased from said second line, said second line front end device forward biased from said second line being connected at a first point to said first line front end device forward biased from said first line, and said second line front end device reverse biased from said second line being connected at a second point to said first line front end device reverse biased from said first line; and
capturing load side stored energy in load side inductances of a load side of said electrical system during exaction of said line replaceable module, said step of capturing load side stored energy using
a third electrical line and a fourth electrical line of said load side,
two third line load side devices connected to said third line, one of said two third line load side devices being forward biased from said third line and the other of said two third line load side devices being reverse biased from said third line, and
two fourth line load side devices connected to said fourth line, one of said two fourth line load side devices being forward biased from said fourth line, the other of said two fourth line load side devices being reverse biased from said fourth line, said fourth line load side device forward biased from said fourth line being connected at a third point to said third line load side device forward biased from said third line, and said fourth line load side device reverse biased from said fourth line being connected at a fourth point to said third line load side device reverse biased from said third line.

17. The method for hot swap of AC or DC line replaceable modules as recited in claim 16, wherein said first line front end devices, said second line front end devices, said third line load side devices, and said fourth line load side devices are diodes.

18. The method for hot swap of AC or DC line replaceable modules as recited in claim 16, said step of capturing front end stored energy further using a capacitor and a resistor which are connected in series, said capacitor and said resistor being connected between said first point and said second point.

19. The method for hot swap of AC or DC line replaceable modules as recited in claim 16, said method eliminating inrush current, current chopping, current transients, and voltage transients occurring during hot swap of said line replaceable module.

* * * * *